United States Patent [19]
Rogus

[11] Patent Number: 5,244,439
[45] Date of Patent: Sep. 14, 1993

[54] ROLLER CHAIN IDLER REPLACEMENT
[76] Inventor: Thomas E. Rogus, Rte. 2, Box 99, Strandquist, Minn. 56758
[21] Appl. No.: 889,480
[22] Filed: May 27, 1992
[51] Int. Cl.$^5$ ............................................. F16H 7/00
[52] U.S. Cl. ..................................... 474/136; 474/190
[58] Field of Search ............... 474/101, 109, 113–117, 474/133–138, 190, 191

[56] References Cited

U.S. PATENT DOCUMENTS

| | | | |
|---|---|---|---|
| 1,442,899 | 1/1923 | Neenan | 474/190 |
| 5,000,724 | 3/1991 | Reid | 474/136 X |

OTHER PUBLICATIONS

Fafnir Idler Pully Unit, p. 60, Fafnir Bearings Catalog © 1985, Fafnir Bearings Division of The Torrington Company.

Primary Examiner—Thuy M. Bui
Attorney, Agent, or Firm—Vidas, Arrett & Steinkraus

[57] ABSTRACT

A tightener roller 40 replaces idler sprockets in roller chain 20 applications to decrease noise and reduce wear on the system components. The roller chain 20 wears parallel alignment grooves 50, 52 in the resilient material 44 of the tightener 40.

3 Claims, 1 Drawing Sheet

ROLLER CHAIN IDLER REPLACEMENT

BACKGROUND OF THE INVENTION

1. Field of the Invention

This invention relates to a tightener to replace idlers on roller chain assemblies.

2. Description of the Related Art

In many applications, roller chain is used to transmit power from a drive sprocket to a driven sprocket. These sprockets each include teeth that mesh with the spaces between rollers on the roller chain.

A chain tightener or idler is usually a part of the system to provide the tension desired in the roller chain. In theory, the idler is adjusted until the roller chain is as taut as desired. Unfortunately, a variety of imperfections result in run-out that causes the chain to whip and lash, increasing wear and noise.

Variance may be found in the chain link itself, in the drive, drive and idler sprockets, any of the three shafts or any of the sprocket teeth. Also, the shaft bearings also contribute to run-out.

Total indicator run (ITR) is the amount of run out from a high to a low point for each component. The individual value can easily be as high as 0.010" (0.025 cm). The composite of all ITR's can be much higher.

Since each component has its own 'high' and 'low', it may take many revolutions before all 'highs' or all 'lows' line up. This variance means that an idler is usually adjusted so the chain is normally slack, and only tight at the highest runout point. Otherwise, the chain would be normally snug, but occasionally too tight when the maximums were reached. This looseness causes more noise, decreases chain life and causes wear on all components.

Whenever chain flexes it wears. Most wear occurs on the slack side of the drive. The tightener of the invention maintains tension holding the chain in a straight line which reduces wear.

SUMMARY OF THE INVENTION

The invention provides an amazingly simple solution to this problem. It employs a resilient roller instead of a toothed-sprocket idler. The links of the roller chain wear into the resilient roller until the depth of the roller chain's rollers is reached. At this point, the roller is readjusted to make the chain as taut as desired. Although runout is still present, the resilient roller absorbs the 'highs' and smooth out the 'lows'. Wear on the chain is reduced by as much as 50%, by reducing chain whip and lash which also provides marked noise reduction.

Another surprising advantage of the invention is that a single resilient roller can replace many sprocket idlers, since it is no longer necessary to stock different idler sprocket sizes. There is no need to match the idler sprocket to the chain.

BRIEF DESCRIPTION OF THE DRAWINGS

A detailed description of the invention is hereafter described with specific reference being made to the drawings in which.

DESCRIPTION OF THE PREFERRED EMBODIMENTS

Figure 1:
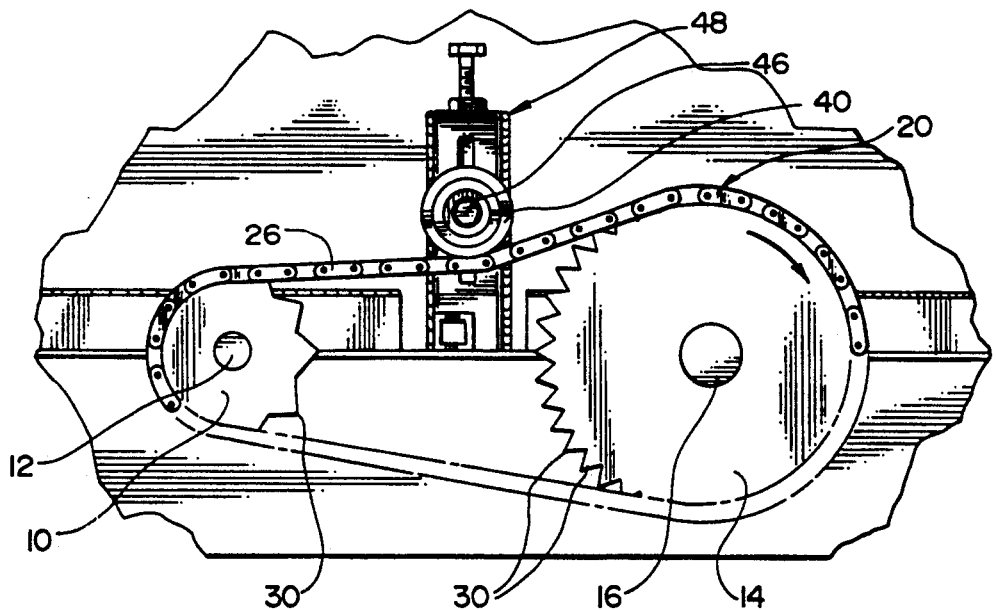
FIG. 1 is a side view of a typical assembly of the roller chain, drive and driven sprockets and the inventive tightener roller.
Figure 2:
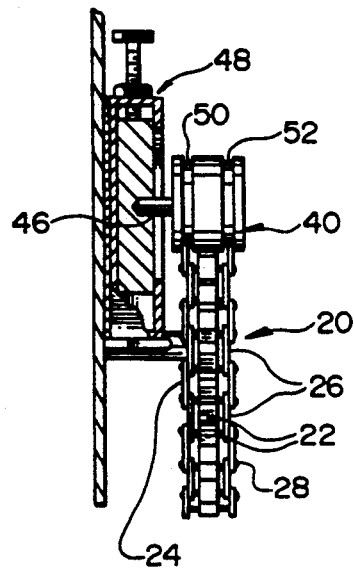
FIG. 2 is a side view of the roller of FIG. 1 showing the two wear grooves formed.
Figure 3:
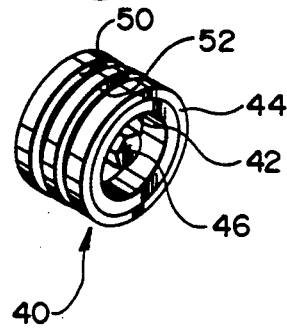
FIG. 3 is a perspective view of the tightener of the invention showing the spaced side bar grooves.

With reference to the Figs., it will be seen that a typical power assembly includes a drive sprocket 10, drive shaft 12, driven sprocket 14, driven shaft 16 and a roller chain 20. The chain 20 is composed of individual links with adjoining rollers 22. The side bars 24, 26 of the individual links extended further out than the roller 22 diameter. The side bars and rollers are usually held together by pins 28. The spacing between the rollers 22 is selected to match the distance between teeth 30 of the sprockets.

The roller tighteners 40 of the invention are exceedingly simple. They are basically rubber rollers of the type used in conveyer belts and the like. In the simplest form, they include a metal journal 42 to which rubber 44 is bonded to form a complete tightener 40. In more elaborate forms, they can include bearings.

The tightener 40 is positioned on the slack side of chain 20. The chain is centered on the tightener, usually in the same position as an original sprocket idler.

A good amount of tension (25-50 pounds) is placed on the tightener 40. Adjustment is made through a tensioner mechanism 48. Basically, the shaft 46 of the tightener 40 is slid along the tensioner mechanism 48 causing more or less tension against the chain. The heavy roller chains take higher tensioning. The side bars 24, 26 of the chain 20 wear grooves 50, 52 into the tightener 40. Grooves may be fully formed in the tightener unit in about 100 hours depending on the tension and material forming the tightener. The tightener 40 is then retensioned and may run for hundreds of hours without noticeable wear.

Periodic retensioning as the roller chain wears decreases any whipping and flexing of the chain. The tightener 40 takes up a good amount of slack and absorbs large runout and pitch variances in the roller chain and sprockets. The tightener 40 is independent of chain pitch.

It is only necessary that the side bars 24, 26 of the chain be positioned somewhere on the circumference of tightener 40 so grooves can form for self-centering and alignment. Once the side bars have worn into the tightener 40 until the chain rollers 22 are reached, wear is virtually eliminated. The tightener 40 then contacts the rollers 22 and not the side bars. The contact formed prevents the rollers 22 from spinning as they do when engaged with idler sprockets. This reduces wear to the rollers 22 of the chain 20.

An installed tightener 40 allows the chain 20 to run the path of least resistance, causing less wear since it eliminates side deflection. The entire system may also pull easier since it pushes the chain away from the tightener preventing an abrupt flexing of the chain. This happens often with idler sprockets.

It has been found that roller chain with a metal idler sprocket creates about 105 decibels, while the simple replacement with a tightener 40 of the invention decreases the decibels to 94. Such sound reduction may be critical in creating a safe work environment.

The tighteners 40 also eliminate chain roller 22 spin, which is also a wear factor in prior systems.

The tightener 40 needs to be resilient such that the 'highs' are quickly absorbed and rebounds to accept the 'lows'. The material of the tightener 40 must momentarily compress when 'highs' are reached. Generally, many plastics and rubbers are available that provide good resiliency and compressibility. Selection should also take into account the ability of the material to resist wear.

Many urethanes provide resiliency, compressibility and wear resistance. The urethanes used in roller skates would make an excellent candidate. The larger the diameter of the tightener 40, the less compressibility required. It should be appreciated that a larger diameter tightener 40 has more material to compress, absorbing more 'highs' and 'lows' than a smaller diameter tightener with the same materials.

Although the grooves 50, 52 may be pre-formed in the tightener 40, it is preferred to allow natural wear to form the grooves. This prevents any need to stock many tightener sizes, since one tightener can be used with many chain sizes.

It has been found that a Philprene 1601 urethane having a Durometer of 59-62, tensile strength of 3400-3800 psi, elongation of 450-500% and a modulus of elasticity of 200% works well. The preferred tightener resilient material 44 is bonded to the underlying metal journal to prevent loss of the material 44. Sandblasting of the metal journal to provide a clean, open pore surface followed by a primer such as Chemlock 220 from Lord Corporation of Erie, Pa. Any other other adhesive to improve the bonding of the resilient material to the remainder of the tightener may be employed, if needed for the application.

When chain first contacts the resilient tightener it begins to compress the tightener. As the chain fully engages with the tightener, compression reaches a maximum and then tapers back to an uncompressed state. There are no abrupt changes applied to the chain in contacting the tightener 40. The contact with the arcuate tightener allows for a gradual transition, flattening out the chain so no sharp flexing can occur. This is even more important if the drive sprocket 10 is markedly different in diameter from the driven sprocket 14.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. In a power system comprising a drive sprocket, a driven sprocket and a roller chain connecting the drive and driven sprockets such that rotation of said drive sprocket rotates said driven sprocket, said roller chain comprising links of opposing side bars between rollers, the improvement comprising:
    a tightener roller positioned against said roller chain and rotatably mounted such that said tightener roller rotates when said roller chain is driven by said drive sprocket, said tightener roller being constructed and arranged to include a resilient, compressible outer surface against which said roller chain rotates, such that said roller chain rollers abut against the resilient outer surface of said tightener roller.

2. A resilient tightener roller comprising a central axis about which a resilient material is arranged, the resilient material defining a circular circumference, the circumference of said resilient roller including a pair of spaced circumferential grooves in the resilient material.

3. A method for reducing wear and decreasing noise in roller chain systems of the type including roller chain of opposing side bars between rollers, said roller chain rotatably connecting a drive sprocket to a driven sprocket, the method comprising:
    (a) interposing a resilient tightener roller against said roller chain under tension such that said resilient tightener rotates as said roller chain is driven;
    (b) allowing said tightener roller to wear until two spaced grooves are formed by said roller chain side bars into said tightener roller; and
    (c) retensioning said roller chain by moving said tightener roller tighter against said roller chain.

* * * * *